United States Patent
Taunton et al.

(10) Patent No.: US 9,326,440 B2
(45) Date of Patent: May 3, 2016

(54) FORWARD FLOTATION DUAL ACTION GROUND PENETRATING DEVICE

(71) Applicant: Kelley Manufacturing Company, Inc., Tifton, GA (US)

(72) Inventors: Mike Taunton, Sparks, GA (US); Charles Sumner, Chula, GA (US)

(73) Assignee: Kelley Manufacturing Company, Tifton, GA (US)

( * ) Notice: Subject to any disclaimer, the term of this patent is extended or adjusted under 35 U.S.C. 154(b) by 116 days.

(21) Appl. No.: 14/201,815

(22) Filed: Mar. 8, 2014

(65) Prior Publication Data
US 2014/0262372 A1 Sep. 18, 2014

Related U.S. Application Data

(60) Provisional application No. 61/801,100, filed on Mar. 15, 2013.

(51) Int. Cl.
*A01B 61/04* (2006.01)
*A01B 63/00* (2006.01)
*A01B 63/114* (2006.01)
*A01C 7/20* (2006.01)
*A01B 35/22* (2006.01)

(52) U.S. Cl.
CPC .............. *A01B 61/044* (2013.01); *A01B 63/008* (2013.01); *A01B 63/114* (2013.01); *A01C 7/203* (2013.01); *A01C 7/205* (2013.01); *A01B 35/22* (2013.01)

(58) Field of Classification Search
USPC ......................................... 172/233, 264, 239
IPC ........................................... A01B 61/04,61/046
See application file for complete search history.

(56) References Cited

U.S. PATENT DOCUMENTS

| | | | | |
|---|---|---|---|---|
| 1,892,978 A * | 1/1933 | Burch | ................. | A01B 61/046 172/234 |
| 2,312,405 A * | 3/1943 | Haagen | ................. | A01B 35/22 172/264 |
| 2,529,809 A * | 11/1950 | Mellen | ..................... | A01B 3/44 172/210 |
| 3,032,123 A * | 5/1962 | Brown | ................. | A01G 23/06 111/101 |
| 3,321,027 A | 5/1967 | Johnson | | |
| 3,528,504 A | 9/1970 | Bushmeyer | | |
| 4,208,974 A * | 6/1980 | Dreyer | ................. | A01B 61/046 111/136 |
| 4,505,337 A * | 3/1985 | Ryan | .................... | A01B 61/046 172/260.5 |
| 5,560,433 A | 10/1996 | Grimm et al. | | |
| 6,564,728 B2 * | 5/2003 | Ryan | .................... | A01B 61/046 111/123 |
| 6,684,961 B2 * | 2/2004 | Ruckle | ................. | A01B 61/046 172/265 |
| 7,921,931 B2 * | 4/2011 | Henry | ................. | A01B 61/046 111/151 |

* cited by examiner

*Primary Examiner* — Gary Hartmann
(74) *Attorney, Agent, or Firm* — Veal Intellectual Property, LLC

(57) ABSTRACT

An apparatus for maintaining a tillage implement such as a plow at a consistent working depth utilizes a spring biased quadrilateral linkage to maintain the tillage implement in a position having to float forwardly and upwardly from the working depth thereby preventing unwanted flotation of the tillage implement from the working depth until the tillage implement encounters a substantially vertical load.

7 Claims, 4 Drawing Sheets

FORWARD FLOTATION DUAL ACTION GROUND PENETRATING DEVICE

FIELD OF INVENTION

The present invention relates to an agricultural tillage device and more particularly to a dual acting ground penetrating device and in ever greater particularity to the linkage which maintains such a device at a constant working depth.

BACKGROUND

Damage of earth working tools such as plows by abnormal draft forces caused by striking obstruction, such as roots, stones, etc., has been an age old problem. The problem is aptly described in U.S. Pat. No. 5,560,433 to Grimm which attempted to solve the problem. Many types of devices have been incorporated in agricultural equipment to compensate for shock loads on the implement caused by abnormal draft forces on the earth working tools. Prior ground working devices utilize both floating and tripping movements, allowing them to vertically float out of the ground or to alternately fully trip rearwardly and upwardly out of the ground. These prior device linkage designs, including U.S. Pat. No. 5,560,433 do not utilize the draft load caused by their in ground movement to resist vertical flotation or to help return the earth working tool to its original working depth after a full trip cycle of said linkage is reached. That is to say, with prior designs, the in ground movement of the tillage device is in direct competition with the ground penetrating devices main ground-load applicator (i.e. a down pressure spring). Thus, the ground movement urges the tillage device to float upwardly and rearwardly in a manner that opposes the downward pressure from the spring. On these prior designs, precautions have to be taken to deal with the negative effects of the in ground movement on their contrary linkage configurations. A need exists for a linkage system that will utilize the draft load from the in ground movement, thereby adding to the load from the main ground-load applicator instead of competing with it, making the device hold itself in the ground flotationally, at the desired working depth, until the pre-designed full tripping load is reached.

SUMMARY OF THE INVENTION

A general object of the invention is to avoid unwanted floatation of the tillage tool above its desired tilling level while allowing the tool to trip should excessive force be encountered to avoid damage to the tool or linkage. Another object of the invention is to use the movement through the ground of the tillage implement to augment the downward force applied by the down pressure spring.

In one embodiment of the linkage configuration of the ground penetrating device, the linkage uses a "float-forward" movement design, which requires the ground attacking tillage device to move forward as the tillage device floats up vertically about the linkage's pivotal connections with the toolbar frame. The result of this design is a ground penetrating device which utilizes ground motion to resist vertical floatation while the tool is in operation at working depth, thus allowing the full down pressure from the associated spring to be applied.

In this embodiment, the design also utilizes the ground motion to help return the ground penetrating tool to its original working depth after a full trip that rotates the device up and out of the ground about its main pivotal connection responsive to excessive force.

BRIEF DESCRIPTION OF THE DRAWINGS

Referring to the drawings which are appended hereto and which form a portion of this disclosure, it may be seen that.

DETAILED DESCRIPTION

Figure 1:
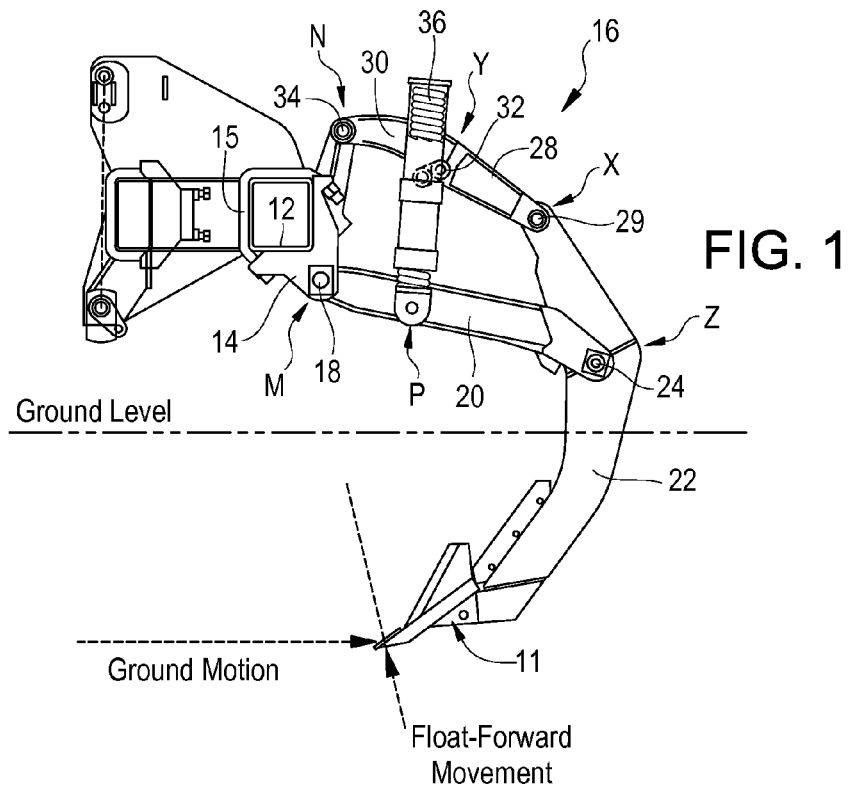
FIG. 1 is side elevational view of an embodiment of the invention with the implement in the normal working position.

One or more of the above objects can be achieved, at least in part, by providing a dual acting linkage which creates an upward and forward float path of the tillage device from its full tillage depth when the tillage device encounters a substantially vertical load. More specifically, the linkage is designed to keep the tillage implement from floating vertically upward and forwardly in the presence of a normal draft load. This tendency to move upwardly and forwardly is counter to the forces imparted to the tillage implement by the movement of a prime mover or tractor pulling the implement across a field, thus the components of the draft load resist such upward and forward movement and tend to force the tillage implement to stay at its optimum tillage depth.

Referring to the drawings for a clearer understanding of the invention it may be seen that the tillage implement 11 or plow unit is connected to a tool bar 12 which is conventionally mounted to a prime mover or tractor, not shown. The tool bar 12 supports a bracket 14 which is secured thereto by a set "V" bolts 15 with complementary nuts and provides a pair of pivot points for the linkage 16 connecting the tool bar to the implement 11. Main pivot pin 18 provides a connection joint M between bracket 14 and the forward end of a main arm 20. The rear end of main arm 20 is connected to shank weldment 22 at joint Z by a pivot pin 24. Shank weldment 22 has tillage implement 11 affixed to its lower end. The upper end of shank weldment 22 is connected to a rear trip link arm 28 at joint X by yet another pivot pin 29. Rear trip link arm 28 is connected at joint Y to top front link trip arm 30 by pin 32. Top front link arm 30 is connected to bracket 14 at joint N by pivot pin 34. Down pressure spring 36 is mounted at joint Y and connected to the main arm 14 at P. It should be noted that the linkage configuration is such that the vertical separation between joint Z and X is always less than the fixed vertical separation between joints M and N at the bracket 14 throughout the entire range of motion of the tillage tool.

In the embodiments shown, when a rock or other immovable object is encountered, two different device reactions are possible. The first possible reaction, when a force (F) greater than the normal draft load is applied to the tillage implement 11 all joints rotate with exception to joint Y, which is the joint between the top front trip link arm 30 and the top rear tip link arm 28. It is this reaction that causes the "riding up" floatation problem of the prior art designs. The second possible reaction, when a force (F), greater than the normal draft load, is applied to the tillage implement 11 is all joints rotate except joint Z, which is the joint between the main arm 20 and the shank weldment 22. It is this reaction that has been purposely designed to occur first when the ground penetrating device encounters the force (F) at the devices working depth. This eliminates the "riding up" problem experienced in the prior art. That is to say, in this linkage configuration of the ground penetrating device, the linkage members have been situated geometrically such that when the dual acting ground penetrating device is at working depth, any force greater than normal draft load will be substantial enough at the main pivotal connection to rotate joint Y and fully trip and rotate the ground penetrating device up and out of the ground. This is because the normal float line for this embodiment is upward and forward, however movement along that float line is resisted by the soil and forward movement of the prime mover, accordingly joint Y "breaks" and the tillage implement rotates.

Figure 4:
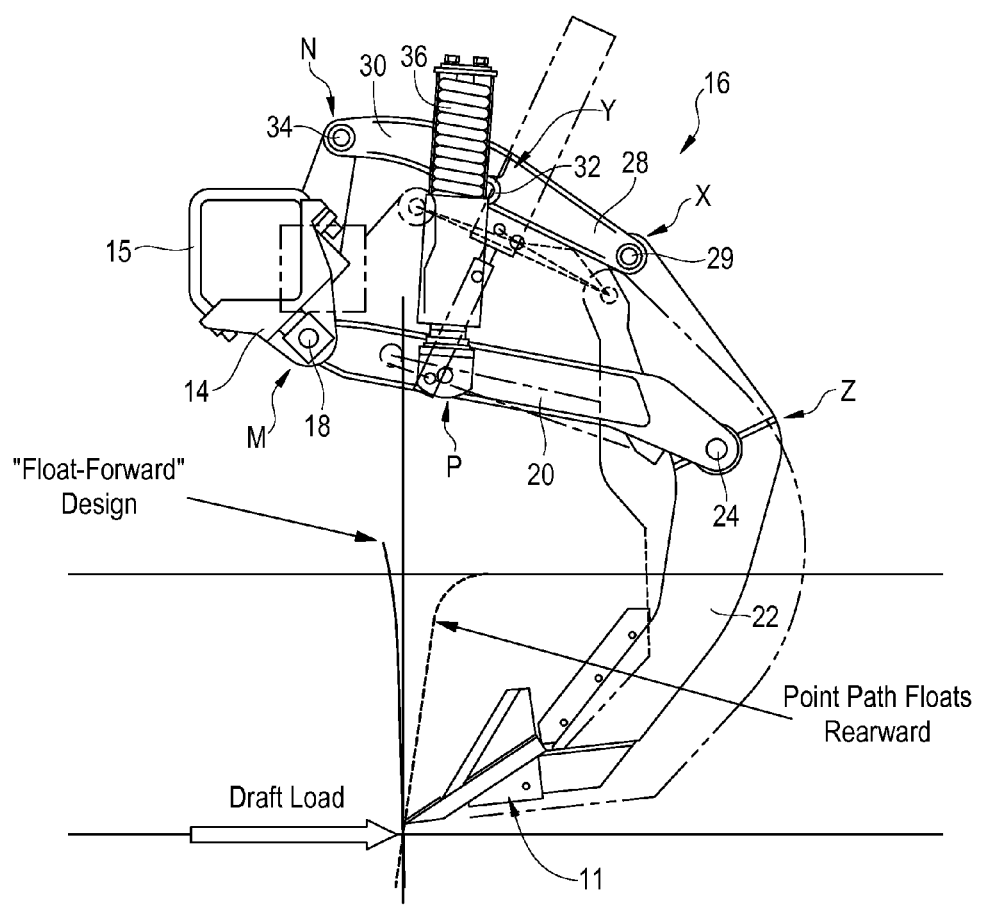
FIG. 4 is a side elevational view of the invention onto a side elevational view of a prior art design.
Figure 5:
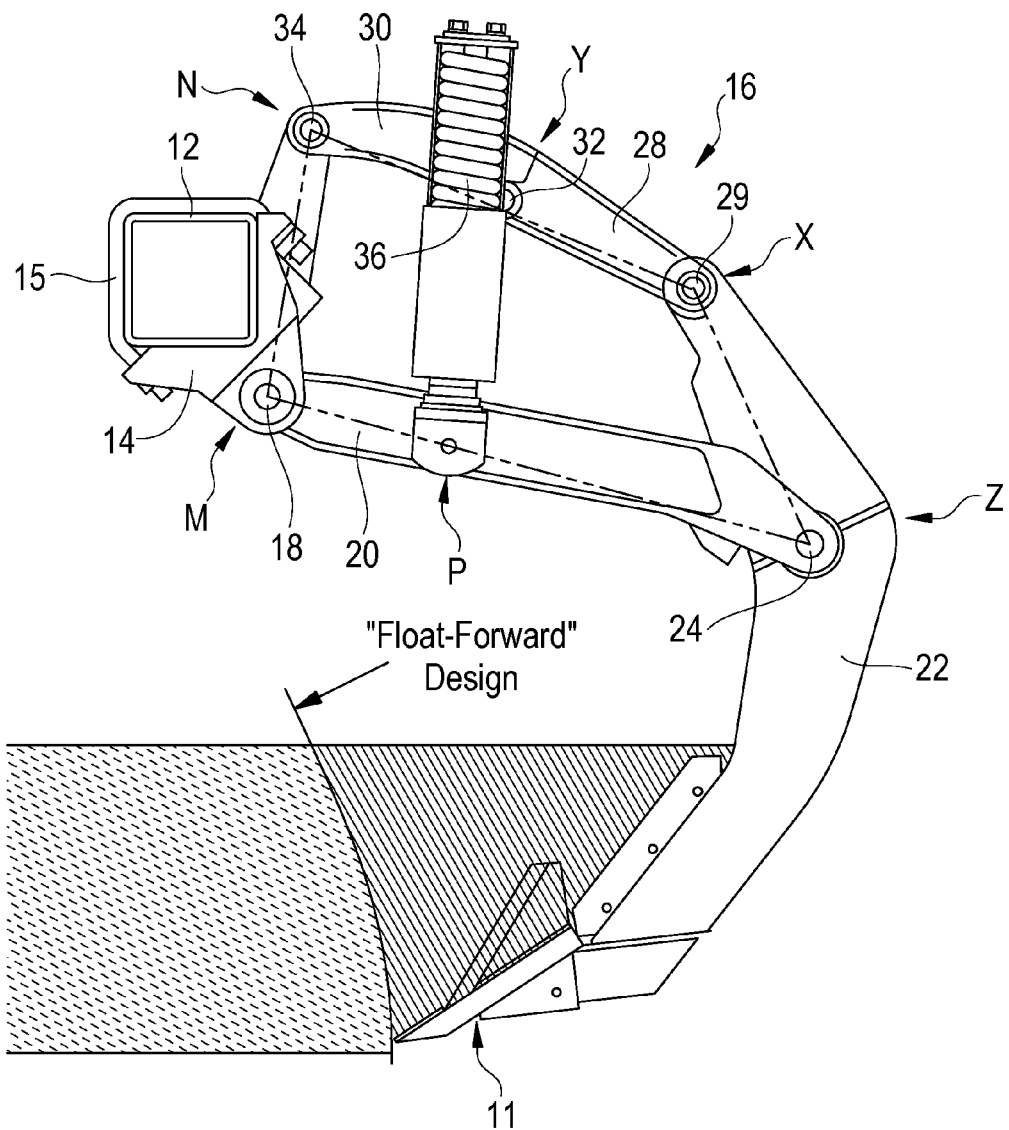
FIG. 5 is a side elevational view of one embodiment of the invention with joint connections labeled.

The difference in the float lines of the present invention and the prior art are shown in FIG. 4. As may be seen the dotted line from the point of the plow upward and rearward is the float path for the tool point in the prior art, thus the normal draft load will tend to cause the tillage implement to rise along this float path in opposition to the downward pressure of spring 36 and the soil will be tilled at an inconsistent depth. In contrast, the float path of the present invention is forward and upward and is resisted by the rearward and downward components of the draft load, thereby maintaining the plow at its desired depth and providing a more uniform tillage.

In one embodiment of the invention, the distance between connections N and X is approximately 73.5% of the length between pivot connections M and Z when in the normal tillage position. Additionally the length between pivot connections Z and X is approximately 50% of the length between pivot connections M and Z. Additionally the length between pivot connections M and N is approximately 48% of the length between pivot connections M and Z. Also, the rearward horizontal distance of connection N to connection M is approximately 16.5% of the length between pivot connections M and N. The working depth of the tillage device is reached when the vertical distance of connection X to connection Z is approximately 91% of the length between pivot connections Z and X. At this point, the vertical distance produced from connection X to connection Z is approximately 96.5% of the vertical distance of connection N to connection M. While the forgoing relationships yield a forward and upward float path for the tillage implement of this embodiment it is important to note that the relationships may be varied to accommodate other forward and upward float paths that do not lead to a rearward movement of the tillage implement point during normal draft loads. Note that the term length refers to the measure along the component whereas distance refers to the actual linear separation between designated points.

Figure 2:
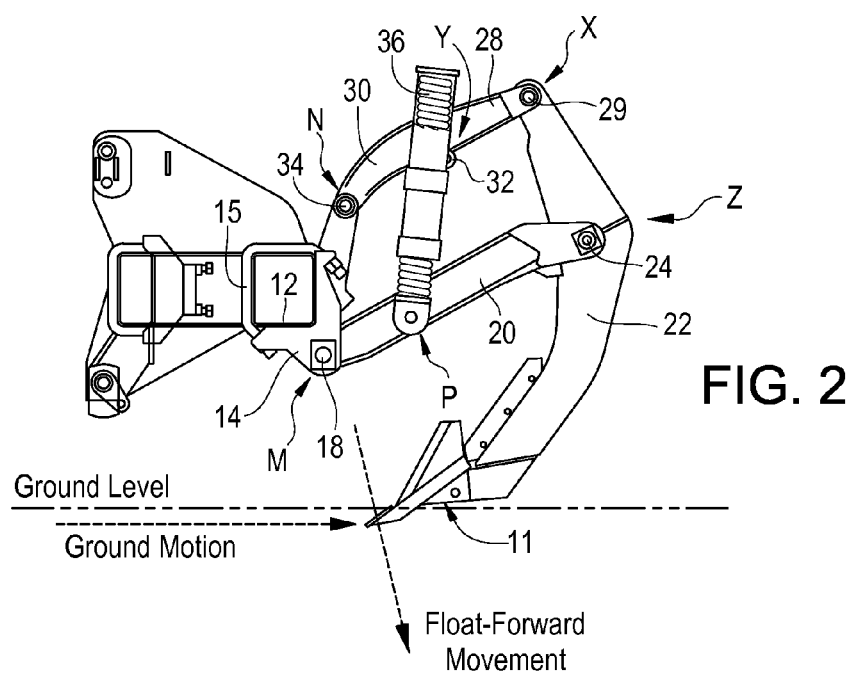
FIG. 2 is a side elevational view of the embodiment of FIG. 1 displaced at a vertically floated position; and, FIG. 3A is a side elevational view showing the interaction of the links in a float movement cycle of the dual acting ground penetrating device.
Figure 3A:
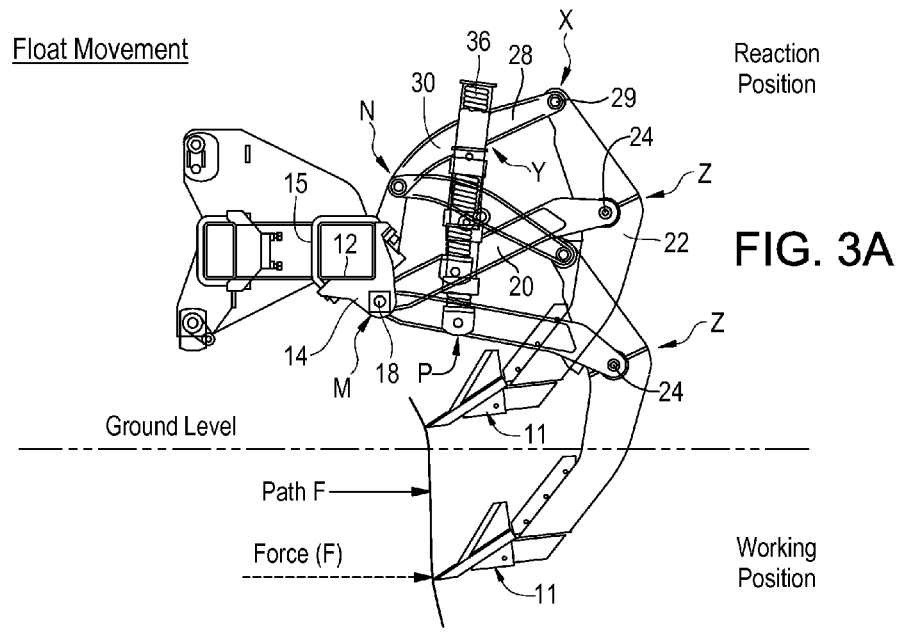
FIG. 3B is a side elevational view showing the interaction of the links in a trip movement cycle of the dual acting ground penetrating device.

Referring to FIG. 1 thru 3*a* for a clearer understanding of the invention, note that in FIG. 1 the implement is depicted at its full draft position. In FIG. 2 the implement is depicted at ground level. FIG. 3*a* is a combined image of the tillage implement at full draft and at an untripped float position just above ground level. It may be noted that the tip of implement 11 above ground level is slightly forward of the tip of the implement 11 at full draft.

Figure 3B:
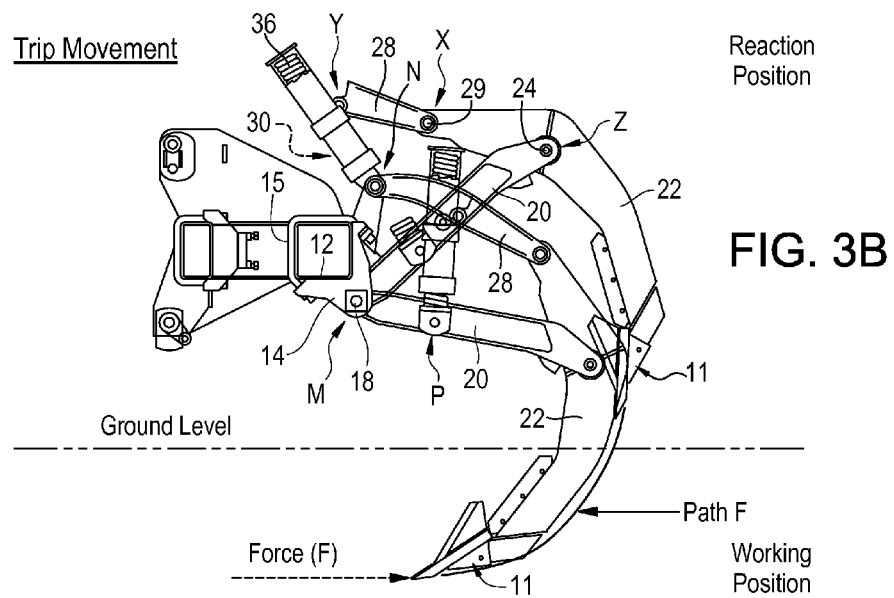

As seen in FIG. 3B, when force in excess of a predetermined amount is encountered, the linkage retracts along a rearward and upward path T until it reaches its full trip position at which point the reset operation begins. This tripping action occurs before the tillage implement will float thus, the stored energy member or spring 36 serves to cushion the tillage implement during operation but it does not allow the tillage implement to rise above its set tillage depth.

While in the foregoing specification this invention has been described in relation to certain embodiments thereof, and many details have been put forth for the purpose of illustration, it will be apparent to those skilled in the art that the invention is susceptible to additional embodiments and that certain of the details described herein can be varied considerably without departing from the basic principles of the invention.

What we claim is:

1. A linkage connecting a tillage implement to a tool bar comprising:
   a. a shank member having said tillage implement connected to its lower end;
   b. a main arm connected between said shank member and a bracket secured to said toolbar;
   c. front and rear break links pivotally connected to each other with said front break link pivotally connected to said bracket and said rear link pivotally connected to said shank member; and,
   d. an energy storage member connected between said main arm and the pivotal connection between said front and rear break links; wherein the geometric configuration of each of said arms, links and weldment are such that excessive draft force applied to said tillage implement creates rotation at the pivotal connection between said front and rear break links prior to rotation between said main arm and said shank member such that said tillage implement is constrained to float upwardly and forwardly, wherein said linkage maintains the angular relationship of said shank member as said linkage urges said tillage device to move upwardly and forwardly as said tillage device encounters a substantially vertical load during normal operation.

2. The linkage according to claim 1 wherein the vertical distance of the pivotal connection between said shank member and said rear break link to the pivotal connection between said main arm and said shank member is less than 100% of the vertical distance between the connection of front break arm to said bracket and the connection of said bracket to said main arm over the entire range of motion of the tillage implement.

3. In a farming implement having a transverse tool bar, a tillage implement configured to seek a predetermined operational ground engaging position as it is pulled through the ground, and a linkage assembly for connecting the tillage implement to the tool bar to induce cushioned vertical floating movement of the plow unit in a generally forwardly and upwardly direction from its operational ground engaging position when a substantial vertical load is encountered and tripping movement from a normal operating position below a surface of the ground to a tripped position above the ground when abnormally high draft conditions are encountered, said linkage assembly comprising a generally vertical shank member connected to said tillage implement, a bracket affixed to said tool bar, a lower fixed length main arm being pivotally connected at one end to said bracket a first pivotal connection and at an opposite end to said shank member for movement about a second pivot connection, a rear break link extending above the main arm, said rear break link being pivotally connected at one end to said shank member at a third pivotal connection and at an opposite end to a forward break link by a fourth pivotal connection, said forward break link pivotally connected to said bracket for movement about a fifth pivot connection, said forward and rear break links joined to each other at said fourth pivot connection arranged between and above an on-center relation relative to said third and fifth pivot connections, and a spring mechanism for normally holding said forward and rear break links in non-collapsible relation relative to each other in the operating position of the plow unit and for inhibiting said plow unit from moving rearwardly until a predetermined draft load has been exceeded as the plow unit is pulled through the ground, said spring mechanism further permitting said elements of said upper link to move to a collapsed relation relative to each other in response to a predetermined trip loading being applied against the plow unit, wherein said second and third pivot connections are separated by a vertical distance which is less than the vertical distance separating the first and fifth pivot connections in all positions of said tillage implement.

4. The farming implement according to claim 3 wherein said linkage assembly maintains the angular relationship of said shank member as said linkage assembly urges said tillage device to move upwardly and forwardly as said tillage device encounters a substantially vertical load.

5. In a farming implement having a transverse tool bar, a tillage implement configured to seek a predetermined operational ground engaging position as it is pulled through the ground, and a linkage assembly for connecting the tillage implement to the tool bar to induce cushioned vertical floating movement of the plow unit in a generally forwardly and upwardly direction from its operational ground engaging position when a substantial vertical load is encountered and tripping movement from a normal operating position below a surface of the ground to a tripped position above the ground when abnormally high draft conditions are encountered, said linkage assembly comprising a generally vertical shank member connected to said tillage implement, a bracket affixed to said tool bar, a lower fixed length main arm being pivotally connected at one end to said bracket a first pivotal connection and at an opposite end to said shank member for movement about a second pivot connection, a rear break link extending above the main arm, said rear break link being pivotally connected at one end to said shank member at a third pivotal connection and at an opposite end to a forward break link by a fourth pivotal connection, said forward break link pivotally connected to said bracket for movement about a fifth pivot connection, said forward and rear break links joined to each other at said fourth pivot connection arranged between and above an on-center relation relative to said third and fifth pivot connections, and a spring mechanism for normally holding said forward and rear break links in non-collapsible relation relative to each other in the operating position of the plow unit, said linkage pivoting about said first and fifth pivotal connection to maintain said tillage implement in said predetermined operational ground engaging position wherein said second and third pivot connections are separated by a vertical distance which is less than the vertical distance separating the first and fifth pivot connections in all positions of said tillage implement and inhibiting said tillage implement from floating rearwardly.

6. In the farming implement of claim 5, said spring mechanism further permitting said elements of said upper link to move to a collapsed relation relative to each other in response to an excessive draft force being applied against the tillage implement.

7. The farming implement according to claim 5 wherein said linkage assembly maintains the angular relationship of said shank member as said linkage assembly urges said tillage device to move upwardly and forwardly as said tillage device encounters a substantially vertical load.

* * * * *